United States Patent
Tan et al.

(10) Patent No.: US 7,352,523 B2
(45) Date of Patent: Apr. 1, 2008

(54) RAMP UNLOAD IN DISC DRIVES

(75) Inventors: Lee Ling Tan, Singapore (SG); Xiong Liu, Singapore (SG); Choon Kiat Lim, Singapore (SG); Mui Chong Chai, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/213,853

(22) Filed: Aug. 30, 2005

(65) Prior Publication Data

US 2006/0221490 A1    Oct. 5, 2006

(30) Foreign Application Priority Data

Mar. 31, 2005   (SG)   .............................. 200502563-0

(51) Int. Cl.
*G11B 21/02* (2006.01)
(52) U.S. Cl. ........................................................ 360/75
(58) Field of Classification Search ..................... None
See application file for complete search history.

(56) References Cited

U.S. PATENT DOCUMENTS

| | | | |
|---|---|---|---|
| 5,889,629 A * | 3/1999 | Patton, III ................... | 360/75 |
| 6,236,527 B1 * | 5/2001 | Uchiike et al. ............... | 360/75 |
| 6,243,222 B1 * | 6/2001 | Boutaghou et al. ....... | 360/73.03 |
| 6,317,284 B1 * | 11/2001 | Feng et al. ................... | 360/75 |
| 6,320,717 B1 * | 11/2001 | Feng ........................... | 360/75 |
| 6,353,510 B2 * | 3/2002 | Drouin ......................... | 360/75 |
| 6,594,102 B1 * | 7/2003 | Kanda et al. ................. | 360/75 |
| 6,694,200 B1 * | 2/2004 | Naim .......................... | 700/94 |
| 6,754,027 B2 * | 6/2004 | Hirano et al. ................ | 360/75 |
| 6,765,746 B2 * | 7/2004 | Kusumoto .................... | 360/75 |
| 6,785,091 B2 * | 8/2004 | Edwards et al. ......... | 360/99.09 |
| 6,795,268 B1 * | 9/2004 | Ryan ....................... | 360/78.04 |
| 6,977,794 B1 * | 12/2005 | Sun et al. ................. | 360/78.06 |
| 7,075,745 B2 * | 7/2006 | Kaneko et al. ............... | 360/75 |
| 2003/0117741 A1 | 9/2003 | Kusumoto | |
| 2004/0080858 A1 | 4/2004 | Suzuki | |

OTHER PUBLICATIONS

Search Report and Written Opinion of the Austrian Patent Office mailed Nov. 15, 2007 in corresponding Singapore Patent Application No. 200502563-0.

\* cited by examiner

*Primary Examiner*—K. Wong
(74) *Attorney, Agent, or Firm*—Nixon & Vanderhye P.C.

(57) ABSTRACT

Embodiments of the present invention provide for apparatus and methods for performing unload operations, including enabling read/write heads to reach a desired velocity at the ramp. Embodiments of the present invention are particularly beneficial for handheld products where low power consumption and reliability are important requirements.

15 Claims, 6 Drawing Sheets

RAMP UNLOAD IN DISC DRIVES

FIELD OF THE INVENTION

The present invention relates generally to data storage devices, and more particularly to methods and apparatus for ramp unload in such devices.

BACKGROUND OF THE INVENTION

Disc drives are among the most widely used means for storing massive amount of data, and must therefore be very reliable. Recently, disc drives are increasingly found in hand-held or portable electronic devices such as audio-visual media players and recorders. Since the majority of these devices are battery-operated, there is now also a need for disc drives to operate with minimal power consumption.

A disc drive typically includes one or more discs mounted on a spindle motor, as well one or more sets of read/write heads configured for writing data to or reading data from the discs. The read/write heads may be coupled to an actuator arm assembly and moved thereby to read data from or write data to various areas or tracks of the discs.

While the read/write heads are configured to "fly" over the surface of a rotating disc when the disc drive is in operation, it is desirable to keep the read/write heads away from the disc surface when the drive is not in operation. This is to avoid inadvertent contact between these components, as they may result in damage to the disc and the corruption of data. For this and other reasons, a disc drive may at certain times "unload" the read/write heads to a ramp positioned next to the disc. In an unloaded state, at least part of the actuator arm bearing the read/write heads will be engaged by the ramp, with the read/write heads suspended away from the disc.

In an exemplary unloading operation, the read/write heads are moved in a direction opposite to a retract direction until the actuator arm is brought to rest by collision with an inner stopper. The actuator arm is then driven by a constant voltage to move in the retract direction, all the way from the inner stopper, up the ramp, and to the rest position on the ramp.

While this may be feasible for some types of disc drives, there remains a need for solutions that will be more efficient and less demanding on the limited power resources of disc drives intended for use with portable consumer electronic devices.

The present invention provides a solution to this and other problems besides offering other benefits, as described below.

SUMMARY OF THE INVENTION

Embodiments of the present invention provide methods of performing ramp unload in disc drives and disc drives configured to perform such methods.

According to embodiments of the present invention, there are provided methods including holding read/write heads at an initial position before moving them towards a ramp disposed adjacent to the disc to reach a target velocity at the ramp. Optionally, the methods may include bringing the read/write heads to an initial position that is located at a recordable region of the disc. The movement of the read/write heads may be characterized by a substantially linear velocity profile or a substantially constant voltage across the motor controlling the movement of the read/write heads. Also provided are apparatus configured to perform methods according to embodiments of the present invention.

Various advantages which characterize embodiments of the present invention will be apparent upon reading of the following detailed description and reviewing of the associated drawings.

DETAILED DESCRIPTION OF THE PREFERRED EMBODIMENTS

For clarity, embodiments of the present invention will be described with reference to a disc drive having one disc and one set of read/write heads that are supported by an actuator arm. Nevertheless, it will be understood that embodiments of the present invention may be applied in various types of disc drives, such as disc drives with varying numbers and arrangements of discs and read/write heads, etc., and that the following description is provided solely for the purpose of illustration and is not intended to be limiting.

Figure 1:
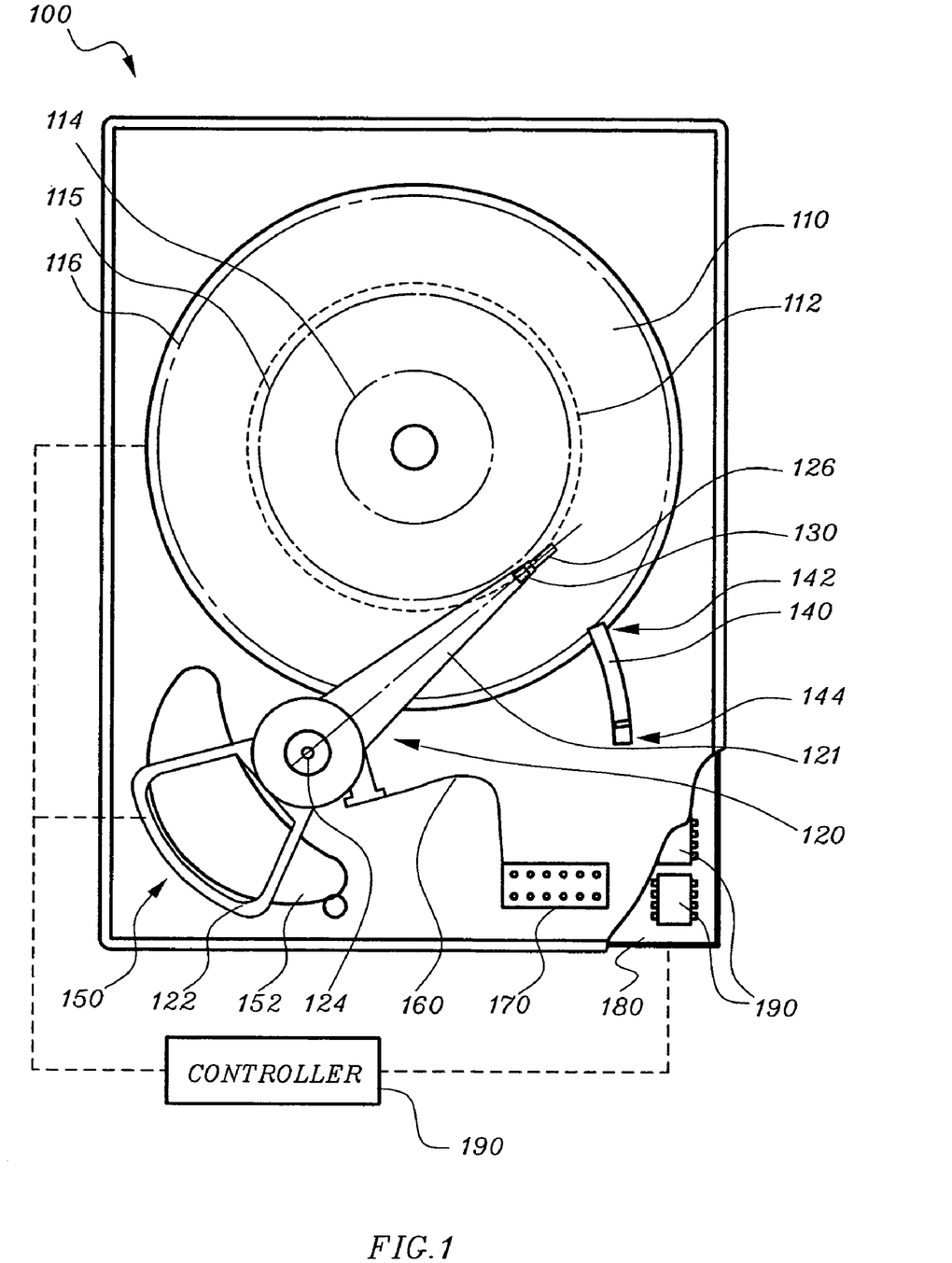
FIG. 1 is a schematic top view of a disc drive for illustrating embodiments of the present invention.

Shown in FIG. 1 is a disc drive 100 configured to perform ramp unload operations according embodiments of the present invention. The disc drive 100 includes a disc 110, an actuator arm assembly 120 having an actuator arm 121, read/write heads 130 supported by the actuator arm 121, and a ramp 140 disposed adjacent to an outer perimeter 116 of disc 110. For convenience, the recordable area of a disc may be described as consisting of three regions: an inner region nearest to the inner perimeter 114 ("ID") of an annular disc, an outer region nearest to the outer perimeter 116 ("OD") of the same, and a middle region ("MD") therebetween. As these are terms of convenience, they may not correlate to or be defined by any particular track or radial dimensions of a disc, but are useful for referring generally to parts of the disc.

Actuator arm assembly 120 is operable by a motor, in this example, a voice coil motor (VCM) 150 including a coil 122 coupled to the actuator arm 121 and a magnet 152. When a voltage is applied to the VCM 150, the resultant electro-magnetic interactions between the moving current in the coil 122 and the magnet 152 produces torque forces that cause the actuator arm 121 to turn about a pivot 124, and thereby move the read/write heads 130 to different areas or tracks of disc 110. Actuator arm 121 may include some form of an extension or tang 126 that is suitably configured to engage ramp 140 as the actuator arm 121 moves towards the outer edge 116.

Figure 2:
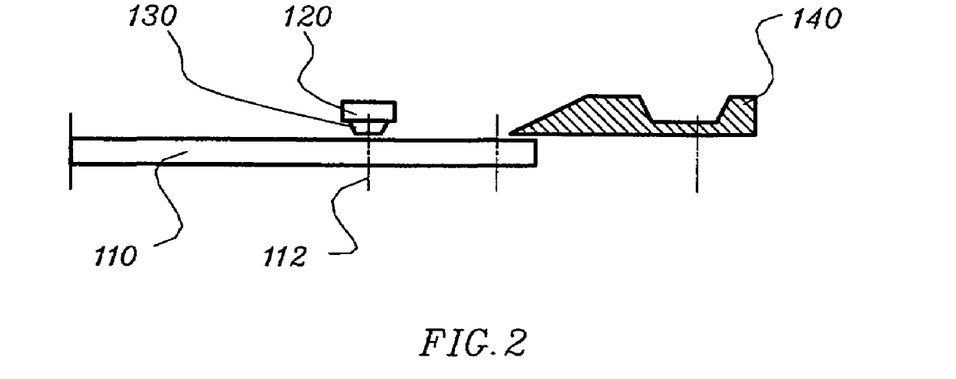
FIG. 2 is an enlarged partial sectional view of FIG. 1.

Ramp 140 may be shaped so that it includes a sloping surface near a surface of the disc 110 (to facilitate engagement with tang 126), a detent 144 shaped to keep the tang 126 from moving off the ramp 140 when the disc drive is not in operation, and an intermediate surface therebetween. The end of the sloping surface nearest to the disc surface will be referred to in this document as a first end 142.

Figure 3:
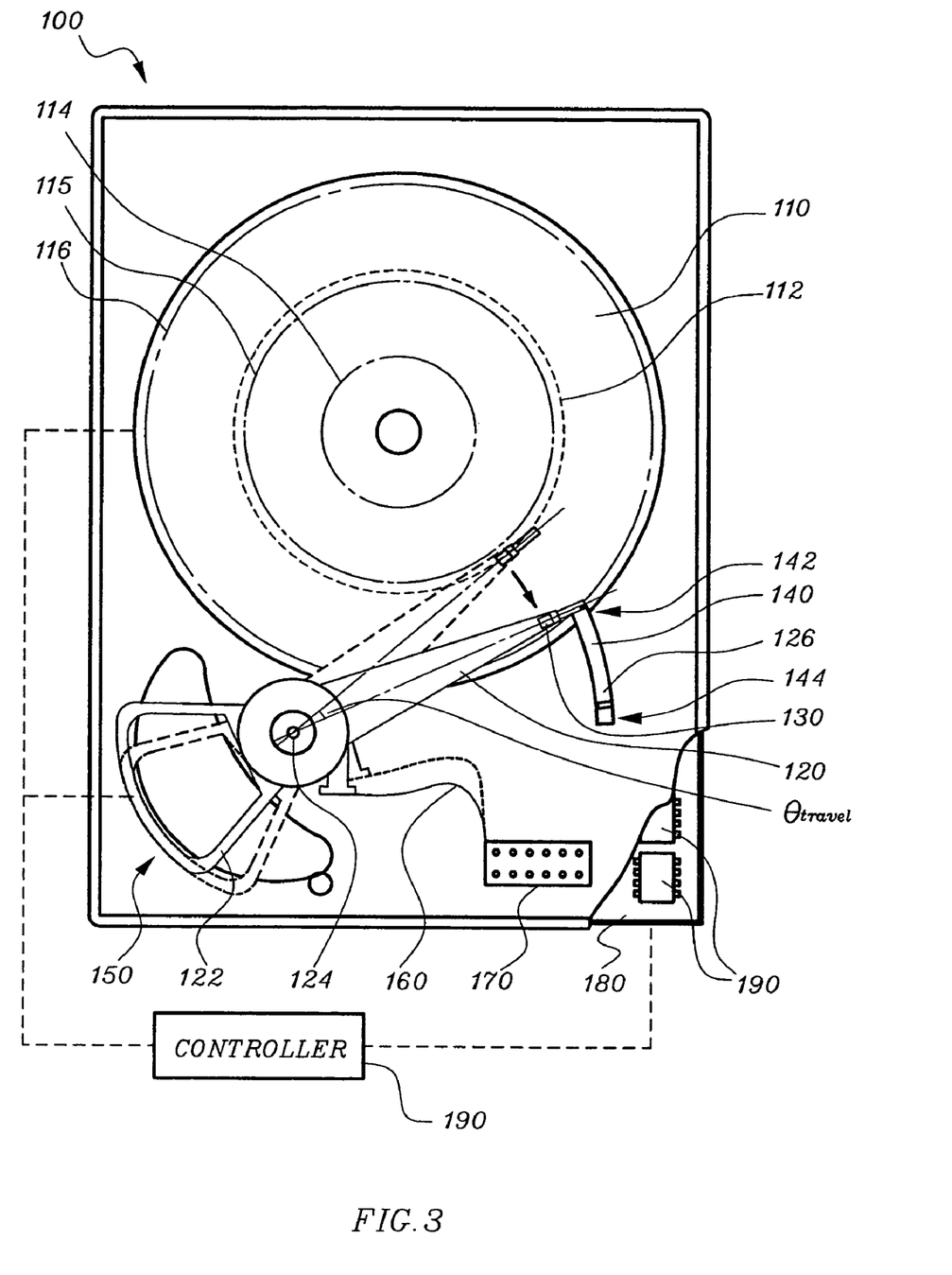
FIG. 3 is a schematic top view of a disc drive showing an unload operation according to embodiments of the present invention.
Figure 5:
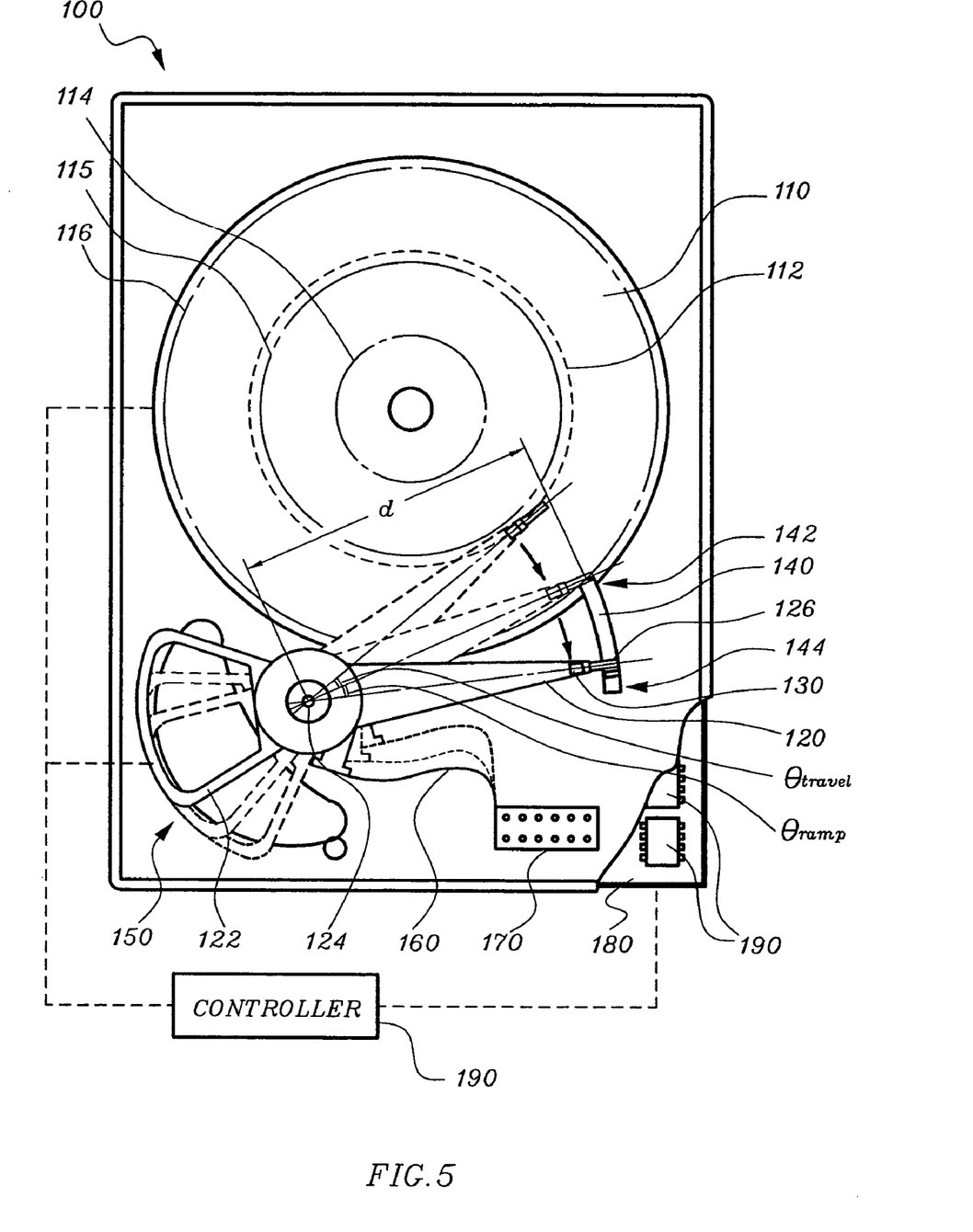
FIG. 5 is a schematic top view of a disc drive for illustrating another aspect of unload operations according to embodiments of the present invention.

A flexible printed circuit cable 160 operably connects VCM 150 and read/write heads 130 to a printed circuit board assembly (PCBA) 180. PCBA 180 is mounted to a housing of disc drive 100, and may communicate with printed circuit cable 160 via a connector 170. The various disc drive components may be controlled by one or more controller devices that form part of PCBA 180. For the purpose of convenience, reference to a controller 190 will be understood to collectively mean any number of devices, for example, as shown in FIGS. 1, 3 and 5, configured to perform such functions as will be described. In other words, controller 190 may be in the form of one or more devices or integrated circuit chips.

In an unload operation according to one embodiment of the present invention, VCM 150 causes actuator arm 121 to move from wherever it was at that time to a track 112, which will be referred to for convenience as an initial track 112. Read/write heads 130 are then allowed to "follow" the initial track 112. A track-following operation may involve reading and processing servo information and using the servo information to determine to what extent the read/write heads are mis-aligned relative to the initial track 112. VCM 150 may then move actuator arm 121 appropriately to keep the read/write heads 130 aligned with the desired track. Next, current associated with a first voltage profile is fed to drive the VCM 150, causing the actuator arm 121 to move from the initial track 112 towards the ramp 140 in a retract direction, until the tang 126 engages the first end 142. Current associated with the first voltage profile or another voltage profile may continue to drive the tang 126 along the sloping surface, along the intermediate surface, and to the detent 144. Thus, the read/write heads 130 can be brought into a state of rest parked away from disc 110.

According to another embodiment of the present invention, the disc drive in operation determines the position of the actuator arm 121 at the time where it is desired to initiate an unload operation. The required current is fed to the VCM 150 so that the actuator arm 121 stops moving. From the servo information read from the disc, the disc drive determines the distance of this initial position of the read/write heads 130 with respect to the first end 142. Thus, the controller is able to determine the required velocity profile under which the actuator arm 121 may travel so that upon reaching the first end 142, the actuator arm 121 will be at a target velocity that is within a desired range of velocity values. The desired range of target velocity values may be determined by the momentum required to overcome frictional forces posed by the ramp to the tang.

In other embodiments, actuator arm 121 is allowed a period of time to settle upon reaching the initial position and thereby dissipate operational vibrations before beginning its movement towards the ramp 140.

According to some embodiments, upon engagement of the tang 126 by the ramp 140, the actuator arm 121 is driven by a second voltage profile that is independent of the first velocity profile.

Figure 6:
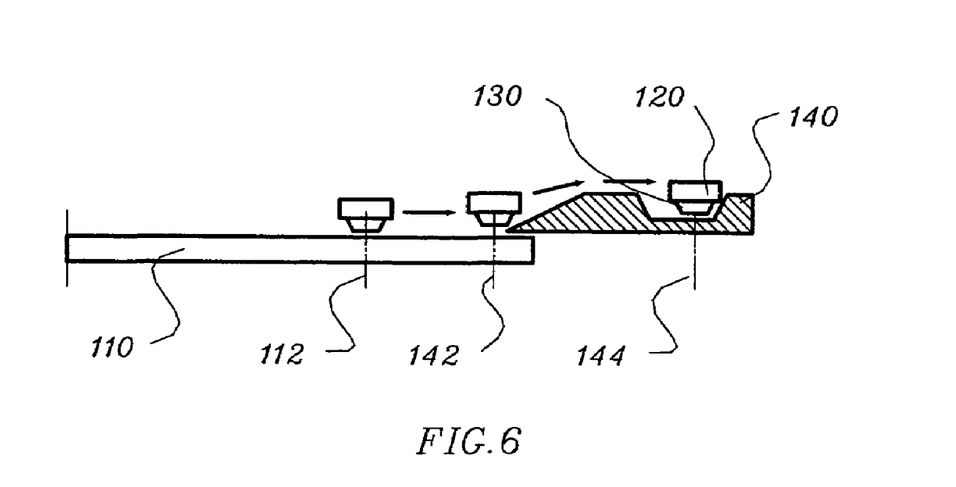
FIG. 6 is an enlarged partial sectional view of FIG. 5.

In alternative embodiments of the present invention, a disc drive is configured to perform an unload operation by first positioning the read/write heads at MD 115 of disc 110. Positioning read/write head 130 at a track 112 in the MD 115 provides advantages over positioning the read/write heads 130 at other locations because the seek time to an MD position is on the average shorter. Hence, the unload operation can be completed in a shorter period of time, saving power consumption as well as enabling the disc drive to respond more quickly to an emergency event that may favor a quick shut-down of the disc drive.

One aspect of these advantages is further explained in the following. Preferably, the disc is kept spinning all the while when the read/write heads are not parked so as to ensure that the read/write heads 130 remain separated from the disc. In the traditionally larger disc drives, should the disc drive suddenly lose power, the inertia of the disc and motor assembly (disc stack assembly) may be relied upon to keep the disc spinning for a sufficient period of time until the read/write heads have been moved safely out of the recordable region of the disc. In disc drives that are intended for consumer applications, the inertia of the disc stack assembly is often able to keep the disc spinning only for a significantly shorter period of time. As described, embodiments of the present invention provide a much needed benefit of enabling unload operations to be completed more quickly. Advantageously, the embodiments are applicable whether or not the disc drive has experienced sudden power loss.

When read/write heads 130 are positioned over an initial track 112 of disc 110, and the initial velocity of actuator arm assembly 120 relative to ramp 140 may be zero or negligibly small. Accordingly to embodiments of the present invention, this initial velocity is used as a reference parameter for determining and controlling unload operations.

Yet another embodiment of the present invention will be described with reference to an actuator arm 121 that is operable by varying the voltage applied to a motor such that read/write heads 130 supported by the actuator arm 121 may be positioned at various locations with respect to a disc 110 or a ramp 140. At the beginning of an unload operation, read/write heads 130 are positioned over disc 110 at zero, or substantially zero, velocity at a distance from the ramp 140. The distance between this initial position of the read/write heads and the ramp can be known because the location of the read/write heads 130 can be determined from the servo information. From previous measurements or from calculations, the momentum required of the actuator arm to successfully mount up the ramp and complete the unload operation can be determined. In other words, a target velocity value to be reached by the actuator arm at the first end 142 of the ramp 140 can be known. For convenience, the first end 142 of the ramp 140 is referred to as a first position 142. Using a suitably configured controller 190, a first voltage profile Vcvr is applied to the motor 150 controlling the movement of the actuator arm 121 so that the motor 150 provides a first torque τ1 and thereby causes the actuator arm 121 to move from an initial velocity at the initial position to a target velocity at the first position 142. This process is further illustrated by the following equations.

The applied voltage Vcvr may be defined as:

$$Vcvr = Ivcm \times Rvcm \quad \text{equation (1)}$$

where Rvcm denotes the resistance of VCM 150 and Ivcm denotes the electrical current fed to VCM 150.

When fed with an electrical current Ivcm, VCM 150 generates the first torque τ1 which may be represented by the following equation:

$$\tau 1 = Ivcm \times Kt = Accel_{cvr} \times J \quad \text{equation (2)}$$

where Kt denotes the torque constant of VCM 150, $Accel_{cvr}$ denotes the angular acceleration of actuator arm assembly 120, and J denotes the moment of inertia of actuator arm assembly 120.

The angular acceleration $Accel_{cvr}$ of actuator arm 121 may also be expressed according to the following equation:

$$Accel_{cvr} = \frac{\omega_{target}^2 - \omega_0^2}{2\theta_{travel}} = \frac{\omega_{target}^2}{2\theta_{travel}} \quad \text{equation (3)}$$

where $\omega_{target}$ is the angular velocity of actuator arm 121 when tang 126 reaches first end 142 of ramp 140. Tribological conditions between ramp 140 and tang 126 may determine an appropriate target velocity range within which the velocity of the tang preferably attains upon reading the first end 142. $\omega_0$ is the initial angular velocity of actuator arm 121 relative to ramp 140 when read/write heads 130 are positioned over the initial track 112 of disc 110. $\theta_{travel}$ is the angular displacement (in radians) of actuator arm 121 between an initial position (shown in FIGS. 1 and 2) and a first position when tang 126 reaches first end 142 of ramp 140 (shown in FIGS. 3 and 4).

When read/write heads 130 are positioned over an initial track 112, actuator arm 121 may be considered stationary relative to ramp 140. Alternatively, the initial angular velocity $\omega_0$ of the actuator arm 121 is brought to at least one order of magnitude less than the target angular velocity $\omega_{target}$. The angular velocity of actuator arm 121 at the point when tang 126 reaches the first end 142 of the ramp 140 is referred to as the target angular velocity. In this example, it is desirable for the initial angular velocity to be negligible when compared to the target angular velocity ($\omega_0 \ll \omega_{target}$). For calculation purposes, $\omega_0$ can therefore be considered negligible, that is, set as zero. Further, since both $\omega_{target}$ and $\theta_{travel}$ are known, $Accel_{cvr}$ can be obtained according to equations (2) and (3). Accordingly, the applied voltage Vcvr can be determined by the following equation:

$$V_{cvr} = \frac{Accel_{cvr} \times J}{K_t} \times R_{vcm} = \frac{\frac{\omega_{target}^2}{2\theta_{travel}} \times J}{K_t} \times R_{vcm} \quad \text{equation (4)}$$

By applying a first voltage profile represented by Vcvr to the VCM 150, the read/write heads 130 are moved from the initial track 112 towards a first track represented by the first end 142 of ramp 140.

The corresponding time period $t_{cvr}$ to apply the voltage to VCM 150 can be determined from equation (5):

$$t_{cvr} = \frac{\omega_{target}}{Accel_{cvr}} \quad \text{equation (5)}$$

According to equation (2), the angular acceleration of actuator arm 121, $Accel_{cvr}$, can be expressed as:

$$Accel_{cvr} = \frac{K_t}{J} \times Ivcm \quad \text{equation (6)}$$

Deriving from equations (1), (5) and (6), $t_{cvr}$ can now be determined by the following equation:

$$t_{cvr} = \frac{\omega_{target} \times R_{vcm}}{\frac{K_t}{J} \times V_{cvr}} = \frac{B}{V_{cvr}} \quad \text{equation (7)}$$

where $$B = \frac{\omega_{target} \times R_{vcm}}{\frac{K_t}{J}}$$

denotes a retract time constant.

Since the angular velocity $\omega_{target}$, resistance Rvcm of VCM, torque constant Kt of VCM 150 and moment of inertia J of actuator arm assembly 120 are known parameters, the retract time constant B and time period $t_{cvr}$ can be determined accordingly. Further, as the mechanical variation of J and Kt can be very small, a relatively consistent target velocity may be achieved by implementing embodiments of the present invention.

Figure 4:
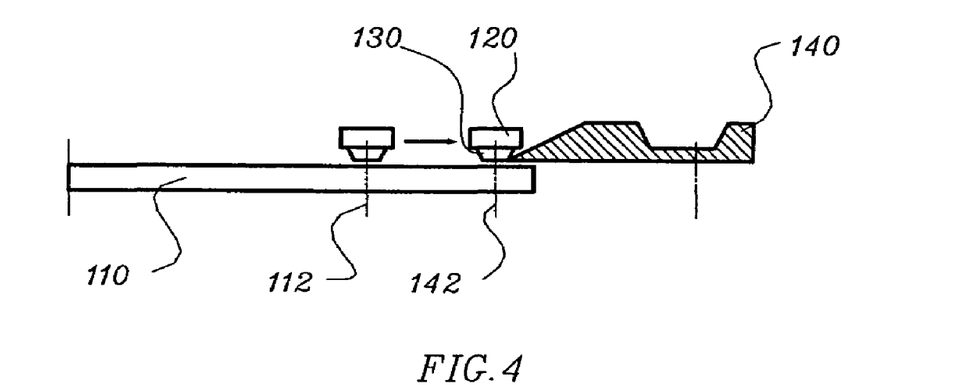
FIG. 4 is an enlarged partial sectional view of FIG. 3.

Optionally, after the time period $t_{cvr}$ lapses, Vcvr may be removed. Actuator arm 121 rotates with respect to pivot 124 at the target angular velocity $\omega_{target}$ when tang 126 reaches first end 142 of ramp 140, as shown in FIGS. 3 and 4. A second voltage profile, $V_{climb(t)}$, may be applied to VCM 150 to further drive actuator arm 121, and cause tang 126 to climb up ramp 140, that is, to move beyond first end 142 and towards the detent. Determination of the second voltage profile $V_{climb(t)}$ and a second torque $\tau 2$ may take into consideration friction between tang 126 and ramp 140.

Derived according to equations (1) and (2), the relationship between the second torque $\tau 2$ and frictional forces can be expressed as follows:

$$\tau 2 = Kt \times V_{climb(t)}/Rvcm = \text{FrictionalForce}(t) \times d \quad \text{equation (8)}$$

$$V_{climb(t)} = (Rvcm \times \text{FrictionalForce}(t) \times d)/Kt \quad \text{equation (9)}$$

where Kt denotes the torque constant VCM 150, Rvcm denotes the resistance of VCM 150 and d denotes the distance from the first end to the pivot 124.

Since Rvcm, Kt and d are known, and FrictionalForce(t) can be determined by the design parameters and material properties of tang 126 and ramp 140, the second voltage profile $V_{climb(t)}$ can be determined.

Preferably, the second voltage $V_{climb(t)}$ is designed to generate a torque which is just enough to overcome the frictional forces such that actuator arm 121 may travel at a constant angular velocity from the first end 142 to the second end 144. The time period $t_{climb}$ for the travel is:

$$t_{climb} = \frac{\theta_{ramp}}{\omega_{target}} \quad \text{equation (10)}$$

where $\theta_{ramp}$ denotes the angular displacement between first end 142 to second end 144 with respect to pivot 124, and $\omega_{target}$ is the angular velocity of actuator arm assembly 120, when tang 126 travels from first end 142 to second end 144 of ramp 140. It may be appreciated that $t_{climb}$ defines the time period during which the second voltage profile $V_{climb(t)}$ is applied to VCM 150.

It should be appreciated from the above that complicated circuits and control schemes may be eliminated. Disc drives configured for performing ramp unload operations according to embodiments of the present invention can thus be more reliable in operation, and cheaper to manufacture because of the simpler system architecture and control schemes.

Figure 7:
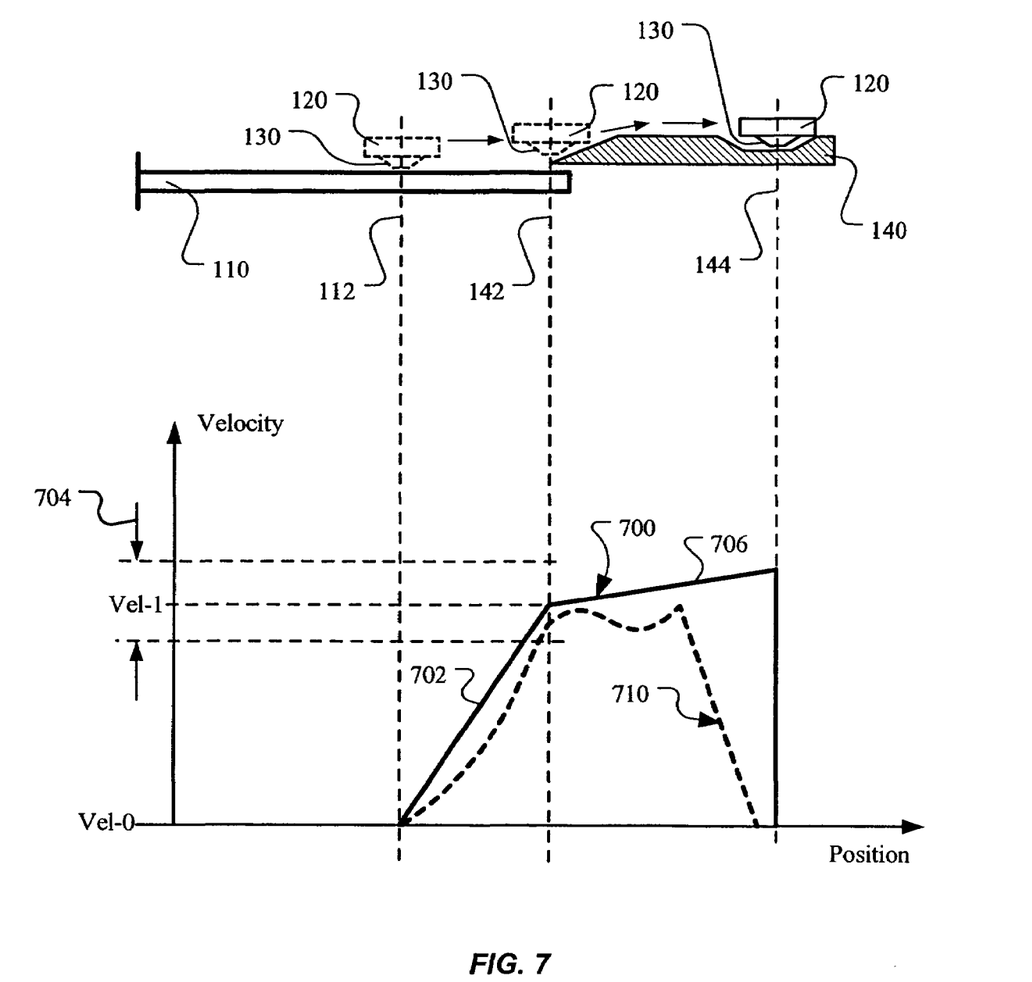
FIG. 7 is a velocity-position chart for illustrating velocity profiles.

FIG. 7 is a velocity-position chart 700 showing the behaviour of an actuator system operating according to embodiments of the present invention. Upon start of an unload operation, read/write heads 130 are positioned at an initial track 112 of disc 110 at an initial velocity Vel-0. The initial velocity need not be absolutely zero, although preferably so. Alternatively, the initial velocity is negligibly small. The read/write heads are then moved according to a first velocity profile 702 until they approach the ramp at a target velocity Vel-1 which is preferably within a desired range 704 of target velocity values. Subsequently, the read/write heads may continue their travel according to a second velocity profile 706. Various other embodiments may exhibit different velocity profiles 710, for example.

Figure 8:
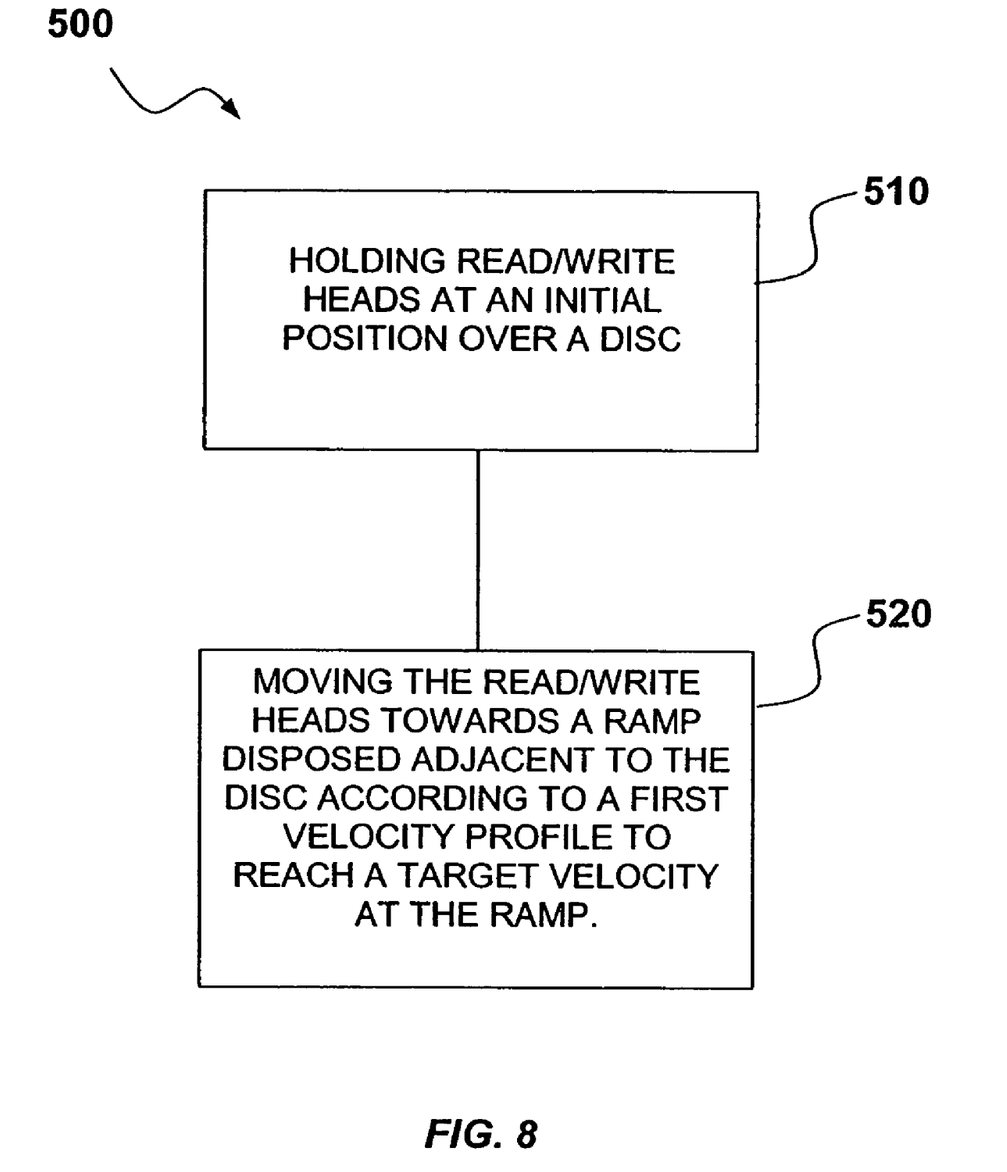
FIG. 8 is a flowchart showing a method according to embodiments of the present invention.

FIG. 8 is a flow chart illustrating a method 500 for unloading read/write heads in a disc drive according to one embodiment of the present invention. The method involves holding the read/write heads at an initial position over a disc, as shown in step 510. The read/write heads are then moved towards a ramp according to a velocity profile, to reach a target velocity at the ramp, as represented by step 520.

Although it can be appreciated that various embodiments of the present invention provide advantageous particularly useful to devices requiring low power consumption and high reliability in performance, it will be understood that the foregoing description of the embodiments is illustrative only, and that changes can be made by one skilled in the art without departing from the scope of the present invention.

The invention claimed is:

1. An unload method comprising:
 moving read/write heads from a pre-unload position to an initial track of a disc at a known distance from a place of rest;
 providing the read/write heads with an initial velocity when the read/write heads are at the initial track; and
 moving the read/write heads towards the place of rest according to a predetermined velocity profile without detecting the velocity of the read/write heads when the read/write heads are being unloaded.

2. The method as recited in claim 1, in which the initial velocity is at least one order of magnitude less than a target velocity.

3. The method as recited in claim 2, in which the initial velocity is zero.

4. The method as recited in claim 1, in which the initial track is located proximate a middle diameter of the disc.

5. The method as recited in claim 1, wherein moving the read/write heads further comprises providing a predetermined current to a motor configured to move the read/write heads.

6. The method as recited in claim 2, wherein the target velocity is a velocity characterizing a momentum sufficient for the read/write heads to move along the ramp.

7. A method for unloading a head, comprising:
 moving a head from a pre-unload position to an initial track of a disc at a known distance from a place of rest, the place of rest being on a ramp;
 providing the head with an initial velocity at the initial track; and
 a step of moving the head towards the place of rest without detecting the velocity of the head during this step.

8. The method of claim 7, wherein moving the head further comprises providing the head with a momentum sufficient to overcome friction presented by the ramp.

9. The method of claim 7, wherein during movement of the head, the velocity of the head is not used to determine the movement of the head.

10. The method of claim 7, wherein the initial velocity is substantially zero.

11. The method of claim 7, wherein moving the head further comprises providing a current to a motor operably coupled to the head.

12. A device comprising:
 a recordable region;
 a reader/writer configured for reading from or writing to the recordable region;
 a ramp configured to hold the reader/writer away from the recordable region;
 a motor operably coupled to the reader/writer, the motor producing a back electromotive force when in operation; and
 circuitry operably connected to the motor, the circuitry being configured to provide a current to the motor sufficient to move the reader/writer from a pre-unload position to an initial track on the recordable region at a known distance from a place of rest on the ramp and then to the ramp without sensing the back electromotive force.

13. The device of claim 12, wherein the circuitry is configured to determine a current to be provided to the motor in a time of moving the reader/writer to the ramp over the known distance without using the back electromotive force of the motor at the time for determining the current.

14. The device of claim 12, wherein the current is determined before the reader/writer is moved from the recordable region to the ramp.

15. The device of claim 14, wherein the current is sufficiently large for the motor to overcome frictional forces at the ramp.

* * * * *